United States Patent [19]

Getreuer et al.

[11] Patent Number: 4,864,552
[45] Date of Patent: Sep. 5, 1989

[54] DRIVING SIGNAL FOR COARSE SERVO EMPLOYING SAMPLED OFFSET SIGNAL

[75] Inventors: Kurt W. Getreuer; David L. Schell, both of Colorado Springs, Colo.

[73] Assignee: Laser Magnetic Storage International Company, Colorado Springs, Colo.

[21] Appl. No.: 902,350

[22] Filed: Aug. 29, 1986

[51] Int. Cl.$^4$ .............................................. G11B 7/09
[52] U.S. Cl. .................... 369/46; 360/77.03; 369/44; 358/342
[58] Field of Search .................... 369/43–46, 369/100, 105–106, 109–112, 124, 275; 250/201 DF; 358/342; 360/77, 77.01–77.03, 77.06

[56] References Cited

U.S. PATENT DOCUMENTS

| | | | |
|---|---|---|---|
| Re. 29,963 | 4/1979 | Janssen . | |
| 3,381,086 | 4/1968 | De Moss et al. . | |
| 4,100,577 | 7/1978 | Naruse et al. | 250/201 X |
| 4,209,804 | 6/1980 | Dil . | |
| 4,232,337 | 11/1980 | Winslow et al. . | |
| 4,419,614 | 12/1983 | Kimura | 369/44 X |
| 4,435,797 | 3/1984 | Hsieh et al. | 369/44 X |
| 4,443,870 | 4/1984 | Hazel et al. | 369/44 |
| 4,446,545 | 5/1984 | Van Dijk | 369/44 |
| 4,451,913 | 5/1984 | Elliott | 369/44 X |
| 4,456,981 | 6/1984 | Silvy et al. | 365/234 |
| 4,494,226 | 1/1985 | Hazel et al. | 369/44 X |
| 4,544,838 | 10/1985 | Musha et al. | 369/44 X |
| 4,587,466 | 5/1986 | Berg et al. . | |
| 4,611,317 | 9/1986 | Takeuchi et al. | 369/45 |
| 4,614,863 | 9/1986 | Sato | 250/201 |
| 4,621,351 | 11/1986 | Baer et al. | 369/44 |
| 4,627,038 | 12/1986 | Abed et al. | 369/44 |
| 4,663,751 | 5/1987 | Kaku et al. | 369/109 X |
| 4,745,587 | 5/1988 | Maeda et al. | 369/44 X |
| 4,745,588 | 5/1988 | Yoshikawa et al. | 369/44 X |
| 4,748,609 | 5/1988 | Yonezawa et al. | 369/44 |

FOREIGN PATENT DOCUMENTS

0099576  2/1984  European Pat. Off. .

Primary Examiner—Alan Faber
Assistant Examiner—W. R. Young
Attorney, Agent, or Firm—Sheridan, Ross & McIntosh

[57] ABSTRACT

An apparatus and method are provided for generating a coarse actuator drive signal. A fine actuator, operatively attached to a coarse actuator, defines an optical pathway through which light reflected from various structures residing on a disk passes. A split detector, attached to the coarse assembly and positioned to intercept light from the optical pathway, receives the light reflected by the structures residing on the disk and generates signals representative of the light incident on each half of the split detector. A difference between the signals produced by the split detector indicates that the coarse actuator is not centered or aligned with respect to the fine actuator. Processing circuitry processes the signals produced by the split detector according to the disk structure utilized to produce the signals and generates a coarse actuator drive signal. The drive signal is applied to the coarse actuator thereby causing the coarse assembly to move and ultimately centering or aligning the fine assembly relative to the coarse assembly.

28 Claims, 4 Drawing Sheets

DRIVING SIGNAL FOR COARSE SERVO EMPLOYING SAMPLED OFFSET SIGNAL

This invention relates to the field of servo signal generation for driving the coarse component of an actuating assembly which positions a beam of radiation with great accuracy over a moving surface containing information in tracks on that surface. It has particular application to the optical disk drive art where such drives include a linear actuator for driving an optical assembly radially over the disk and a fine servo actuator which directs the radiation beam to the optical assembly. It has application to drives with any sort of fine actuator system, including, at least, tilting mirror and two-axis linear optic driver motor fine actuators and any others in which displacement of the fine actuator causes a corresponding shift in the location of the returned beam spot on the detector.

BACKGROUND

In practically all optical drives, including compact disk audio players, the information tracks on the disk are randomly accessed and followed by a servo system which incorporates a coarse and a fine tracking actuator. The coarse tracking actuator may be, for example, a linear voice coil motor with ball bearings or a sliding bearing, or a linear motor coupled across a pivot point to drive the optics in an arc approximately radially across the disk. Examples of fine tracking actuators are pivoting galvo galvanic response driven mirrors, a spring suspended linear fine servo motor, as for example, that set out in U.S. Pat. No. 4,587,466, and rotating and sliding fine servo motor, such as that found in the Sony DISCMAN, a retail trade product available from Sony of Japan. (Spring suspension could mean suspension by rubber as is known to those in the art.)

To create a tracking servo system, the actions of the fine and the coarse actuators have to be coordinated in some manner. A common method is to follow the perceived movements of the fine servo motor. Using a sensor to determine the direction and/or amount of movement of the fine servo motor and the associated electronics increases the cost and complexity of the coarse actuator servo system. The sensing system may also work, for example, by measuring the average current supplied to the coil of the fine servo motor because that current is linearly related to the driving force; and in spring suspended systems, the driving force itself is linearly related to the displacement of the spring loaded or suspended mass (the mass being the mirror or optics and associated assembly) for frequencies below the natural mass-spring resonance frequency. While sensing the average current rather than the movement of the motor itself provides a lower cost method for generating servo information for the coarse actuator, because the mass-spring resonances are generally around 20 to 70 Hz, access actions occurring around 100 milliseconds (which are required for fast random access) do not allow enough time to average the fine servo motor current in such a way that the true fine servo motor movement can be sensed.

The use of the low frequency component of the fine servo drive signal to control the coarse servo is also known. See, for example, U.S. Reissue No. RE29,963 incorporated herein by reference (particularly see column 1, lines 5, 12-30). The generation of samplable signals by use of a "mirror area" is described in European Pat. Application No. EP 99576, incorporated herein by reference.

SUMMARY OF THE INVENTION

This invention teaches how to sense the "off center" position of a fine tracking actuator in an optical disk drive (compact disk player or recorder-player combinations for data retrieval, etc.) by measuring shifts in the beam path without the addition of optical components, extra photodetectors or external sensors. The sensed "offset-from-center" position of the fine tracking actuator serves as input to a coarse actuator servo stage.

Figure 1:
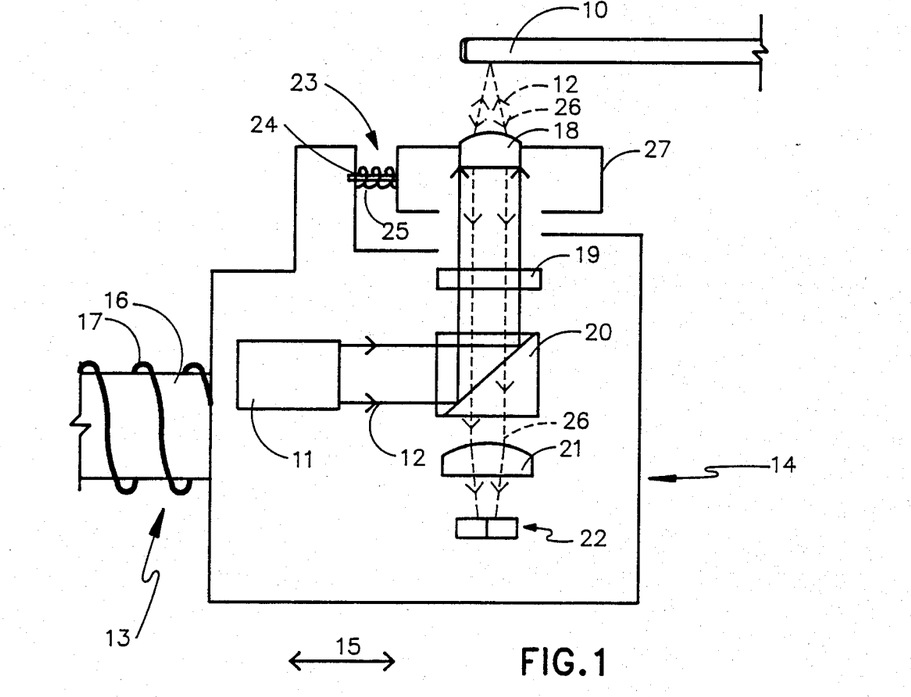
FIG. 1 is a heuristic diagram for illustrating the effect of the actuator motor on the beam path.

Referring first to FIG. 1 in which the physical components of a system in which this invention functions are shown, a portion of the rotating disk is designated with the numeral 10, and a laser and associated optics 11 produces a linearly polarized and collimated laser beam 12. The coarse actuator 13 drives the optical assembly 14 linearly in the directions indicated by arrow 15. For illustration purposes only, the actuator 13 is described as a magnetizable rod 16 and a coil 17 arranged in such a way that energization of the coil 17 drives rod 16 in either of the directions indicated by arrow 15. The optical assembly 14 nominally comprises (for purposes of illustration) an objective lens element 18 mounted to a moveable assembly 27, quarter wave plate 19, a beam splitter prism/mirror 20, an astigmatic lens 21, and a photo detector 22. All these elements except the moveable assembly 27 and the laser 11 are firmly fixed to the optical assembly 14. Fine actuator 23 is also represented, similarly to coarse actuator 13, by a moveable rod 24 surrounded by a coil 25 for purposes of illustration only. The moveable assembly may be suspended magnetically or by springs or by the fine actuator or in other ways known to those in the art.

The path traversed by the laser beam 12 begins with laser and optics 11 which directs the beam 12 to beam splitter-mirror 21, of which beam the polarization is made circular by quarter wave plate 19, passing to the objective lens 18 and then it impinges on the disk 10. Modulations of the disk surface influence the return beam 26, returning through lens 18 and then the polarization is 90° from its original orientation by quarter wave plate 19, it passes through the mirror of element 20, then through lens 21 to photodetector 22.

Many other optical paths may be used, so long as the movement of the fine actuator displaces the returning beam spot on the detector.

Figure 2A:
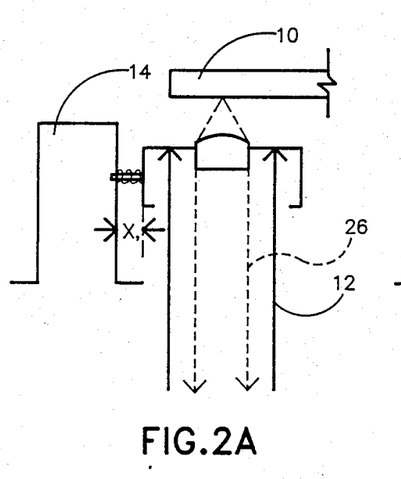
FIGS. 2A and 3A are "cutouts" of FIG. 1, illustrating movement of the moveable assembly.
Figures 2B, 3B, 4:
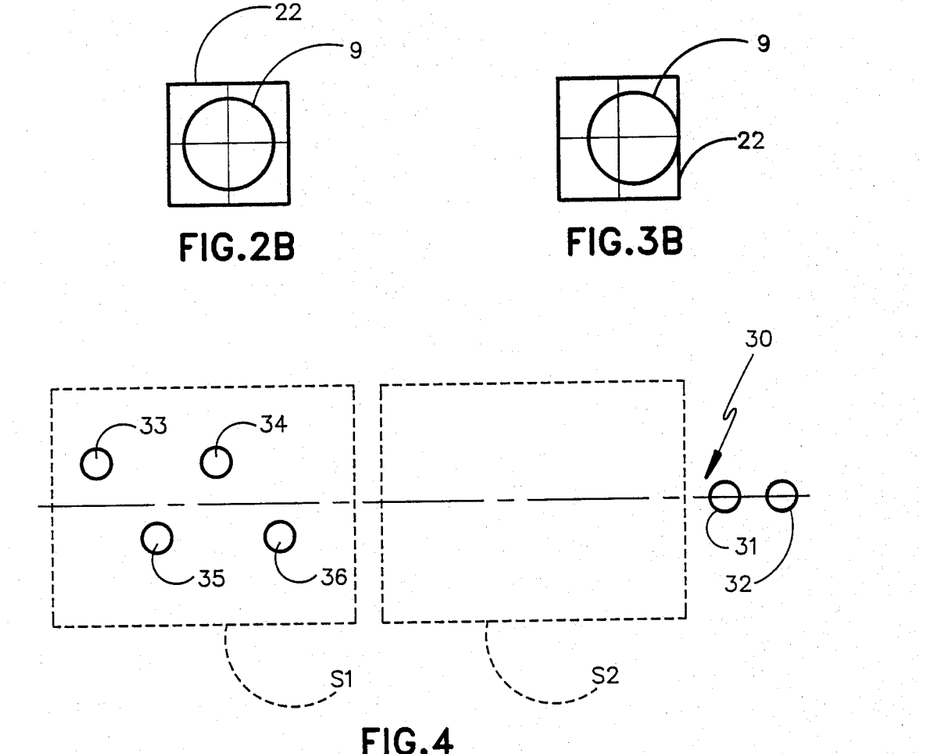
FIGS. 2B and 3B illustrate the returned beam spot on detector 22 corresponding to positions of the moveable assembly of FIGS. 2A and 3A, respectively.
FIG. 4 is a segment of information track.
Figure 3A:
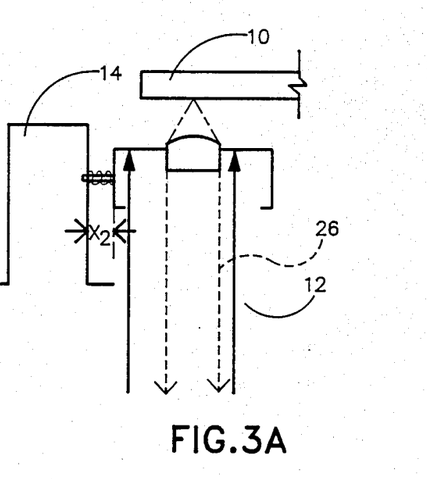

To see how the shift of the beam spot may be recognized by the detector, see FIGS. 2A, 3A, 2B and 3B which are self-explanatory and employ elements of FIG. 1. FIGS. 2A and 2B illustrate the situation where the actuator is centered and FIGS. 3A and 3B show the situation where the actuator is off center with respect to the incoming or returned laser beam. Note also that in other beam paths in other systems a tilting mirror may be moved by a fine actuator motor to deliver the beam between the laser, the disk and the detector. The inventory herein described applies equally well to such systems.

Note that all drive signals (focus, data or information read signal, fine tracking and, with this invention, coarse tracking) are derivable from a single detector. In some optical recorder/drive systems, two detectors are used (one for focus, one for tracking/read signals), and this invention may be applied in such systems, too, so long as one of the detectors is "split" in the correct orientation (such that the fine actuator movements cause the laser beams to shift in a direction perpendicular to the split).

In FIG. 4, a segment of a track 30 is shown, which track is not defined by any ablation or change in height in the surface of the information bearing disk or structure, but is logically definable by a center line CL. On it may be written information for various purposes along the center line which information may be recorded as pits or spots of different optical properties than the rest of the information bearing surface, such as non-reflective pits 31 and 32. A segment such as segments $S_1$ is used to generate tracking information for the fine servo motor control loop. Where this off-centered pit segment provides the sole indicator to generate track following signals, it must occur sufficiently often to provide such signals. This may be done either by using just the off-center pits at a high enough sampling rate or by employing it to correct a continuous, low frequency tracking signal by means of apparatus set forth in copending application Ser. No. 760,440 filed on July, 30, 1985 (now abandoned) or to generate a tracking signal similarly to the method explained in U.S. Pat. No. 4,456,981, both incorporated herein by reference or in similar ways as are known to those in the art.

Note again FIGS. 2A, 3A, 2B and 3B, and recognize that the shift of the movable assembly 27 with respect to the return beam optical path is what causes the shift of the beam spot 9 on the detector 22. Subtracting the value of the outputs of the left and right sides of the split or quad photodetector 22, therefore, gives a signal related to this shift of the beam on the detector and thus the shift of the fine actuator or moveable assembly vis-a-vis the coarse actuator. Where off track center information is also present in the returned beam, a flat, nonmodulated area, segment $S_2$, of the disk's surface may be used to get a true signal to determine this off-center measurement. Note that there must be enough $S_2$ type areas to allow for a sampling rate sufficient to assure stability of the coarse servo loop.

The track 30 of FIG. 4 has no groove but is a logical line following center line CL. Off center modulations 33, 34, 35 and 36 will modulate the returned beam 26 to indicate to which side of the center line the beam spot is impinging on the disk where the sum signal for segment $S_1$ is taken and sampled for left and right pit occurrences. The signal from $S_2$ would be used to determine the shift of the returned beam spot with respect to the detector and thus the fine actuator movement.

Figure 5:
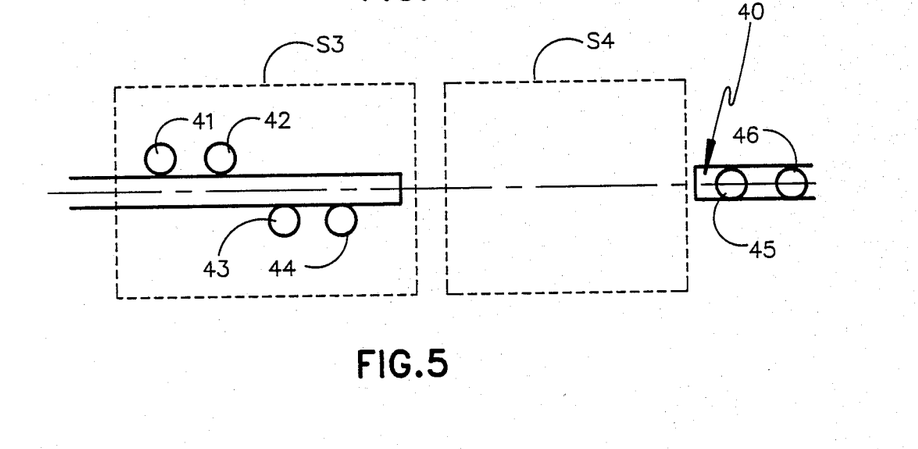
FIG. 5 is a another segment of information track.

FIG. 5 illustrates a different structure for the track which might also be used with this invention. In this structure, a track groove 40 is centered around the center line of the track and has a depth of approximately one-eighth of the wavelength of the incident radiation beam used with the particular system. The deviation of an incident radiation beam from the center line of such a track groove may be used to generate a radial push-pull signal as is well known to one of ordinary skill in this art. Although many other low frequency tracking signals may be used, example of the push pull signal may be found in U.S. Pat. Nos. 4,232,337; 4,209,804 and 4,100,577 incorporated herein by this reference. Again, the track may include, for example, off-centered pits 41, 42, 43 and 44 in segment $S_3$, which may be used to adjust the radial push-pull signal to provide an accurate track off-center indicator for generating servo signals for the fine actuator as described above, or to generate an accurate tracking signal by themselves where the occurrence is frequent enough.

Segment $S_4$ is an area of the disk which does not contain the grooved track, but is between two grooved parts of the track and functions in exactly the same manner as the segment $S_2$ of FIG. 4.

Figure 8:
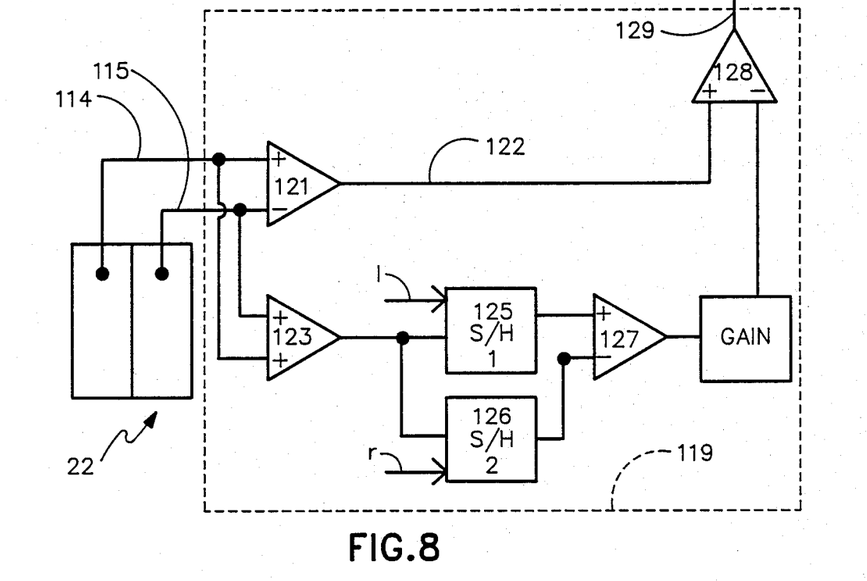
FIG. 8 is a block diagramatic representation of an alternative coarse servo signal generation system.

Note that disk track formats could be used which do not employ the mirror areas shown as segments $S_2$ and $S_4$ of FIGS. 4 and 5. This is true so long as the format includes structures from which two tracking signals may be derived; one which provides an indication of shifts of the beam relative to the detector and one which does not. Note also that the difference between these two tracking signals may be used as the signal sent to the coarse tracking loop. A preferred embodiment for this which can also be used with spring or magnetically suspended systems is described with respect to FIG. 8 below. For example, a track having wobbled off-center pits and a continuous groove allows for a difference signal to be produced from the signals read from these two modulations which difference yields information on the shift of the returned beam spot on the split detector relative to the split. Referring now to FIG. 8 in which a coarse actuator drive signal generating apparatus 119 is described, the apparatus 119 receives input from detector 22 on lines 114 and 115. The continuous difference of this input is generated by differential amplifier 121 on line 122. Sample and Hold gates 1 and 2 (125 and 126, respectively) permit the passing of a sum signal from amplifier 123 at the times of expected passage of left or right wobbled signals, indicated on enable lines l, and r, respectively. The difference between these signals, given by differential amplifier 127, is provided as gain adjusted input to differential amplifier 128, whose other input is line 122. The output 129 may be used as input to the coarse servo loop, as described with reference to FIG. 7 below.

The optical pathway in a random access optical disk reader or reader/recorder is often not stable enough to assume safely that when the beam spot is centered on the detector the fine servo actuator is centered with respect to the coarse servo actuator. As a result, the low frequency (determinable over several sampled areas) component of the mirror area signal can be unreliable. A way to generate a reliable low frequency component is by using the low frequency content of the fine actuator drive signal where the fine actuator is spring or magnetically suspended. This is because the drive signal is directly related to the displacement of the fine actuator.

Figure 6:
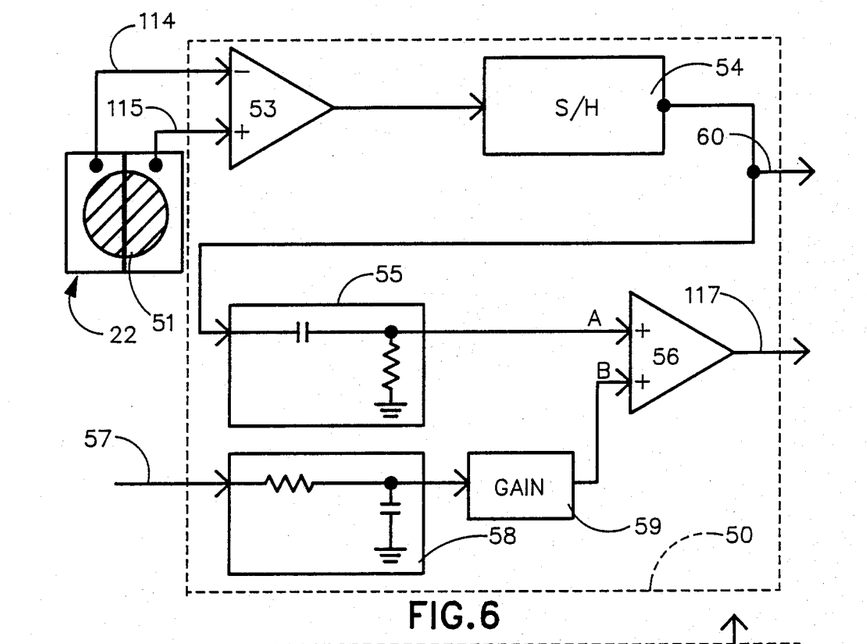
FIG. 6 is a diagramatic representation of the circuit elements used in generating the coarse actuator signal from the tracks of FIGS. 4 or 5.

To see this, turn now to FIG. 6 in which a block diagram of the coarse actuator signal generating means is shown and designated by the numeral 50, the information from the track areas shown in FIGS. 4 or 5 will be taken from a reflected spot 51 on split-photo detector 22, the strength of whose signal is monitored (from each half) by a differential amplifier 53. Sample and hold gate 54 will permit only that part of the signal generated by amplifier 53 to pass which is synchronized with the mirror areas on the disk, i.e., segments $S_2$ and $S_4$ of FIGS. 4 or 5. Methods for generating a synchronizing signal to allow only that portion of the signal which represents the mirrored areas are well known to those skilled in the art. The high frequency portion of this sampled signal is allowed to pass by high pass filter 55 (with representative elements thereof drawn therein but to be taken as illustrative elements only) to a summing amplifier 56 as signal A. The signal used to drive the fine servo motor is fed into low pass filter 58 by line 57 simultaneously with its input into the fine servo motor. The high and low pass filters should have the same corner cutoff frequency. The cutoff lies below the natural resonant frequency of the mass-spring system of the fine actuator and its suspension system. The output of the low pass filter 58 is gain adjusted by a gain stage 59, the gain setting being such that signals A and signals B have about the same sensitivity in terms of the ratio of voltage to distance. In other words, the gain adjustment should assure that if the low frequency component of the drive signal for the fine actuator is such that an increase of "a" volts in signal B would mean a movement of the spot on the disk 10 of "ax" meters, then the shift in signal A should also be "a" volts. Thus the signal generated by summing amplifier 56 may be used as the only drive signal to drive the coarse servo actuator for tracking and seeking. For non-spring and non-magnetically suspended fine actuators, the signal at line 60 may be used as input into the coarse actuator loop for tracking and seeking.

Figure 7:
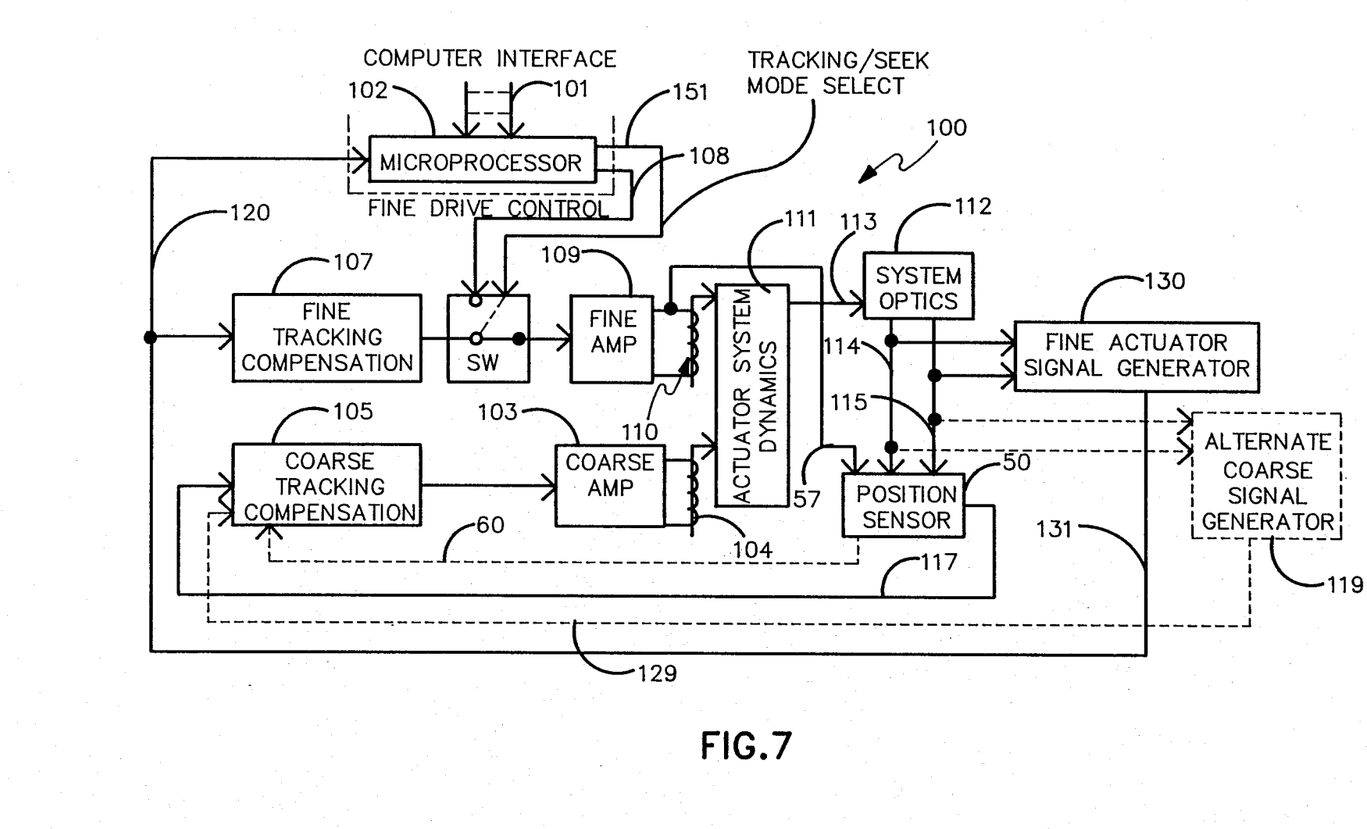
FIG. 7 is a diagramatic representation illustrating how the position sensor fits into a random access disk system.

Note the electronic components of system 50 are designated by a dotted line, because they comprise the functional elements of a position sensor 50 found in FIG. 7. FIG. 7 describes the relationship of the position sensor to the optical disk drive tracking and seeking control system 100. When called upon through the interface to the computer 101, the microprocessor 102 may direct the seeking or tracking function of the disk drive. Seek may be accomplished by fine drive control line 108, which drives the fine amplifier 109 to drive the fine actuator 110 directly. (Seeking may be enabled by switch SW which is activated by line 151 to allow direct control of the fine actuator). Fine tracking compensation 107 provides phase margin in the fine tracking loop, which is necessary for a stable tracking loop. Coarse tracking compensation 105 does much the same thing with respect to the coarse tracking loop. The coarse actuator tracking loop includes coarse amplifier 103, coarse actuator 104 and coarse tracking compensation 105. The physical characteristics of the actuator and drive assembly through actuator dynamics 111 result in a feedback of the incident radiation beam from the disk to the system optics 112 by a physical path here only represented by line 113. Through lines 114 and 115, the split detector 22 as part of system optics 112, indicates the position of the beam spot 51 with respect to it and information located in the beam spot due to modulations of the disk, such information and centering being detectable through a position sensor 50 which generates a signal on line 117 which is fed as a drive signal to coarse tracking compensation 105.

Alternatively, a simplified version could take output from line 60 directly to drive the coarse servo (see dotted line 60 in FIG. 7). This provides an alternative way of correcting the push-pull signal and to correct for optical misalignments. As a result of using this alternative, however, the fine actuator may not be centered, so it would have to adjust to its own spring forces. All in all, not a preferred embodiment.

In any event, where the coarse actuator is driven by a signal sensitive to the misalignment of the beam to the detector, such a signal can be used to drive the coarse actuator during seek, so long as the mirror areas are nested in radially aligned locations on the disk.

Note that the other input to position sensor 50 is line 57. Line 57 should come from a signal directly correlated to the fine actuator 110 drive signal. System optics 112, by generating signals across lines 114 and 115 or their equivalent, allows in various ways for the construction of a fine actuator signal generator 130 (such as that described in the previously referenced U.S. application Ser. No. 760,440) and the signal output from this fine actuator signal generator will appear in properly amplified form on line 131. This signal will also be available for tracking error status detection or track count detection on line 120.

Note that in using this invention, one may center the fine actuator before starting tracking or seeking without an external sensor. This may be accomplished with the following steps. Start rotating the disk. Focus the beam spot on the information surface. Sample the mirror areas with the split detector, and send the resultant signal to the fine servo loop (that is, before enabling the coarse amplifier, use the signal from line 117 to center the beam spot returned from the mirror areas). This resultant signal should be continuously available to sum with the fine actuator drive signal.

Obvious variation of the above will occur to one skilled in the art and is not excluded by the following claims.

What is claimed is:

1. A system for generating a coarse actuator drive signal in an optical information storage device, comprising:

a recording medium having intermittently spaced means for providing light, wherein said light is used to determine the position of a fine assembly relative to a coarse assembly;

a fine assembly having an optical pathway for receiving light provided by said intermittently spaced means;

a coarse assembly operatively connected to said fine assembly, said coarse assembly movable relative to said fine assembly and said fine assembly movable relative to said coarse assembly;

an optical detector connected to said coarse assembly for receiving light from said optical pathway and producing information relating to the position of said fine assembly relative to said coarse assembly, said optical detector having a first element for receiving light from said optical pathway and generating a first component of said information, said first component being representative of the light incident on said first element, and a second element for receiving light from said optical pathway and generating a second component of said information, said second component being representative of the light incident on said second element, wherein the light incident on said first and second elements provides information regarding the position of said fine assembly relative to said coarse assembly;

means for processing said information and for generating a coarse actuator drive signal for use in positioning said coarse assembly relative to said fine assembly, said means for processing having means for taking the difference between said first component and said second component thereby producing a first signal and means for sampling said first signal according to said intermittent spacing to generate said coarse actuator drive signal; and a coarse actuator, responsive to said coarse actuator drive signal, for positioning said coarse assembly relative to said fine assembly.

2. A system, as claimed in claim 1, wherein said optical detector comprises:

a single, split optical detector for producing all of the information necessary for the production of a coarse actuator drive signal, wherein said single, split optical detector provides all of the information necessary to provide at least one of the following optical information storage device operations; focusing, reading information and fine tracking.

3. A system, as claimed in claim 1, wherein:

said intermittently spaced means includes mirror areas for reflecting light incident thereon.

4. A system for generating a coarse actuator drive signal in an optical information storage device, comprising:

a recording medium having mirror areas for reflecting light incident thereon, said mirror areas having intermittent spacing on said recording means;

a fine assembly having an optical pathway for receiving light reflected by said mirror area;

a coarse assembly operatively connected to said fine assembly, said coarse assembly movable relative to said fine assembly and said fine assembly movable relative to said coarse assembly;

a coarse actuator for moving said coarse assembly;

an optical detector connected to said coarse assembly for receiving light from said optical pathway and producing information relating to the position of said fine assembly relative to said coarse assembly, said optical detector having a first element for receiving light from said optical pathway and generating a first component of said information, said first component being representative of the light incident on said first element, and having a second element for receiving light from said optical pathway and generating a second component of said information, said second component being representative of the light incident on said second element; and means for processing said information and for generating a coarse actuator drive signal thereby causing said coarse actuator to position said coarse assembly relative to said fine assembly, said means for processing having means for subtracting said first component from said second component thereby producing a first signal, said first signal being representative of the position of said fine assembly relative to said coarse assembly and means for sampling said first signal according to said intermittent spacing to generate said coarse actuator drive signal.

5. A system for generating a coarse actuator drive signal in an optical information storage device, comprising:

a recording medium having mirror areas for reflecting light incident thereon, said mirror areas having intermittent spacing on said recording medium;

a fine assembly having an optical pathway for receiving light reflected by said mirror areas;

a coarse assembly operatively connected to said fine assembly, said coarse assembly movable relative to said fine assembly and said fine assembly movable relative to said coarse assembly;

a coarse actuator for moving said coarse assembly;

an optical detector connected to said coarse assembly for receiving light from said optical pathway and producing information relating to the position of said fine assembly relative to said coarse assembly, said optical detector having a first element for receiving light from said optical pathway and generating a first component of said information, said first component being representative of the light incident on said first element, and having a second element for receiving light from said optical pathway and generating a second component of said information, said second component being representative of the light incident on said second element;

means for processing said information and for generating a coarse actuator drive signal thereby causing said coarse actuator to position said coarse assembly relative to said fine assembly, said means for processing having means for subtracting said first component from said second component thereby producing a first signal, said first signal being representative of the position of said fine assembly relative to said coarse assembly; means for sampling said first signal according to said intermittent spacing to generate a second signal; means for high-pass filtering said second signal to eliminate a first low frequency information in said second signal and thereby producing a third signal; means for providing a second low frequency signal; and means for adding said second low frequency signal to said third signal thereby replacing said first low frequency information eliminated by said high-pass filtering and producing said coarse actuator drive signal.

6. A system, as claimed in claim 5, wherein said means for providing a second low frequency signal comprises:

means for providing a fine actuator drive signal.

7. A system, as claimed in claim 6, wherein said means for adding comprises:

means for low-pass filtering said fine actuator drive signal to produce said second low frequency signal;

means for adjusting the gain of said second low frequency signal thereby producing a fourth signal and achieving like sensitivity with said third signal; and means for summing said third signal and said fourth signal thereby producing said coarse actuator drive signal.

8. A system for generating a coarse actuator drive signal in an optical information storage device, comprising:

a recording medium having a first area, responsive to incident light, for providing first light and a second area, responsive to incident light, for providing second light;

a fine assembly having an optical pathway for receiving said first light and said second light produced by said first area and said second area;

a coarse assembly operatively connected to said fine assembly, said coarse assembly movable relative to said fine assembly and said fine assembly movable relative to said coarse assembly;

an optical detector connected to said coarse assembly for receiving light from said optical pathway and producing information relating to the position of said fine assembly relative to said coarse assembly, said optical detector having a first element for receiving light from said optical pathway and generating a first component of said information, said first component being representative of the light incident on said first element, and a second element for receiving light from said optical pathway and generating a second component of said information, said second component being representative of the light incident on said second element, wherein the light incident on said first and second elements and produced by said first area provides information on the position of said fine assembly relative to said coarse assembly and undesirable information, wherein the light incident on said first and second elements and produced by said second area provides information for at least partially eliminating said undesirable information;

means for processing said information produced by said first and second areas and for generating a coarse actuator drive signal wherein said means for processing uses said information produced by said second area for at least partially eliminating said undesirable information from the information produced by said first area; and a coarse actuator, responsive to said coarse actuator drive signal, for positioning said coarse assembly relative to said fine assembly.

9. A system, as claimed in claim 8, wherein said optical detector comprises:

a single, split optical detector for producing all of the information necessary for the production of a coarse actuator drive signal, wherein said single, split optical detector provides all of the information necessary to provide at least one of the following optical information storage device operations: focusing, reading information and fine tracking.

10. A system, as claimed in claim 8, wherein: said first area includes wobbled pits and said second area includes a groove.

11. A system for generating a coarse actuator drive signal in an optical information storage device, comprising:

a recording medium having a first area for reflecting light incident thereon and a second area for reflecting light incident thereon;

a fine assembly having an optical pathway for receiving light reflected by said first area and said second area;

a coarse assembly operatively connected to said fine assembly, said coarse assembly movable relative to said fine assembly and said fine assembly movable relative to said coarse assembly;

a coarse actuator for moving said coarse assembly;

an optical detector connected to said coarse assembly for receiving light from said optical pathway and producing information relating to the position of said fine assembly relative to said coarse assembly, said optical detector having a first element for receiving light from said optical pathway and generating a first component of said information said first component being representative of the light incident on said first element, and having a second element for receiving light from said optical pathway and generating a second component of said information, said second component being representative of the light incident on said second element;

means for processing said information and for generating a coarse actuator drive signal thereby causing said coarse actuator to position said coarse assembly relative to said fine assembly, said means for processing having means for producing a first signal from said first component and said second component as a result of light being reflected from said first area, said first signal having a first part and a second part; means for producing a second signal from said first component and said second component as a result of light being reflected from said second area, said second signal having a third part being substantially similar to said second part; and means for subtracting said second signal from said first signal thereby producing a coarse actuator drive signal having substantially said first part.

12. A system, as claimed in claim 11, further comprising:

means for adjusting the gain of said second signal thereby producing like sensitivity between said first signal and said second signal.

13. A system, as claimed in claim 11, wherein:

said first area is comprised of a continuous groove; and said second area is comprised of a first set of pits disposed on one side of said continuous groove and a second set of pits disposed on the other side of said continuous groove, said first set of pits having a first intermittent spacing, and second set of pits having a second intermittent spacing.

14. A system, as claimed in claim 13, wherein said means for producing a first signal comprises:

means for subtracting said first component from said second component thereby producing said first signal.

15. A system, as claimed in claim 13, wherein said means for producing a second signal comprises:

means for summing said first component and said second component thereby producing a sum signal;

means for sampling said sum signal according to said first intermittent spacing thereby producing a first sampled signal;

means for sampling said sum signal according to said second intermittent spacing thereby producing a second sampled signal; and means for subtracting said second sampled signal from said first sampled signal to produce said second signal.

16. A method for generating a coarse actuator drive signal in an optical information storage device, comprising:

projecting light onto and thereby producing light from intermittently spaced means residing on a recording medium;

receiving light produced from said intermittently spaced means using a fine assembly, with said fine assembly operatively connected to a coarse assembly, said coarse assembly movable relative to said fine assembly and said fine assembly movable relative to said coarse assembly;

directing said light produced from said intermittently spaced means and received by said fine assembly to an optical detector connected to said coarse assembly, said optical detector producing information relating to the position of said fine assembly relative to said coarse assembly;

generating a first component of said information using a first element of said optical detector, said first component being representative of the light incident on said first element;

generating a second component of said information using a second element of said optical detector, said second component being representative of the light incident on said second element;

processing said information to generate a coarse actuator drive signal, said step of processing including taking the difference between said first component and said second component thereby producing a first signal and further sampling said first signal using said intermittently spaced means to generate a coarse actuator drive signal; and applying said coarse actuator drive to a coarse actuator to position said coarse assembly relative to said fine assembly.

17. A method, as claimed in claim 16, wherein the step of directing, comprises:

directing light to an optical detector used in at least one of the following optical information storage device operations: focusing, reading information and fine tracking.

18. A method, as claimed in claim 16, wherein said step of producing light, comprises:

producing light using intermittently spaced mirror areas.

19. A method, as claimed in claim 16, wherein said step of processing further comprises:

high-pass filtering said coarse actuator drive signal to eliminate first low frequency information in said coarse actuator drive signal and thereby producing a third signal;

generating a second low frequency signal; and adding said second low frequency signal to said third signal thereby replacing said first low frequency information eliminated by said high-pass filtering and producing an improved coarse actuator drive signal.

20. A method, as claimed in claim 19, wherein said step of providing a second low frequency signal comprises:

providing a fine actuator drive signal.

21. A method, as claimed in claim 20, wherein said step of adding comprises:

low-pass filtering said fine actuator drive signal to produce said second low frequency signal;

adjusting the gain of said second low frequency signal thereby producing a fourth signal and achieving like sensitivity with said third signal; and summing said third signal and said fourth signal thereby producing said coarse actuator drive signal.

22. A method for generating a coarse actuator drive signal in an optical information storage device, comprising:

projecting light onto and thereby producing light from a first area and a second area residing on a recording medium;

receiving light produced from said first area and said second area using said fine assembly, with said fine assembly operatively connected to a coarse assembly, said coarse assembly movable relative to said fine assembly and said fine assembly movable relative to said coarse assembly;

directing said light produced from said first area and said second area and received by said fine assembly to an optical detector connected to said coarse assembly, said optical detector producing information relating to the position of said fine assembly relative to said coarse assembly;

generating a first component of said information using a first element of said optical detector, said first component being representative of the light incident on said first element;

generating a second component of said information using a second element of said optical detector, said second component being representative of the light incident on said second element, wherein the light incident on said first and second elements and produced from said first area provides information on the position of said fine assembly relative to said coarse assembly and undesirable information, wherein the light incident on said first and second elements and produced from said second area provides information for at least partially eliminating said undesirable information;

processing said information to generate a coarse actuator drive signal, said step of processing including using the information produced from said second area for at least partially eliminating said undesirable information produced from said first area; and applying said coarse actuator drive signal to a coarse actuator to position said coarse assembly relative to said fine assembly.

23. A method, as claimed in claim 22, wherein said step of directing comprises:

directing light to an optical detector used in at least one of the following optical information storage device operations: focusing, reading information and fine tracking.

24. A method, as claimed in claim 22, wherein said step of processing further comprises:

producing a first signal from said first component and said second component as a result of light being produced from said first area, said first signal having a first part and a second part, wherein said first part includes information on the position of said fine assembly relative to said coarse assembly and undesirable information, and said second part further includes said undesirable information;

producing a second signal from said first component and said second component as a result of light being produced from said second area, said second signal having third part, said third part being substantially similar to said second part; and subtracting said second signal from said first signal thereby producing a coarse actuator drive signal having substantially said first part.

25. A method, as claimed in claim 24, further comprising:

adjusting the gain of said second signal thereby producing like sensitivity between said first signal and said second signal.

26. A method, as claimed in claim 24, wherein said step of producing light from a first area and a second area further comprises:

producing light from said first area having a groove and said second area having a first set of pits disposed on one side of said continuous groove and a second set of pits disposed on the other side of said continuous groove, said first set of pits having a first intermittent spacing, and said second set of pits having a second intermittent spacing.

27. A method, as claimed in claim 26, wherein said step of producing a first signal comprises:

subtracting said first component from said second component thereby producing said first signal.

28. A method, as claimed in claim 26, wherein said step of producing a second signal comprises:

summing said first component and said second second component thereby producing a sum signal;

sampling said sum signal according to said first intermittent spacing thereby producing a first sampled signal;

sampling said sum signal according to said second intermittent spacing thereby producing a second sampled signal; and subtracting said second sampled signal from said first sampled signal to produce said second signal.

* * * * *